April 18, 1944.  F. J. VOGEL  2,347,009
ELECTRICAL APPARATUS
Filed June 14, 1941  3 Sheets-Sheet 1
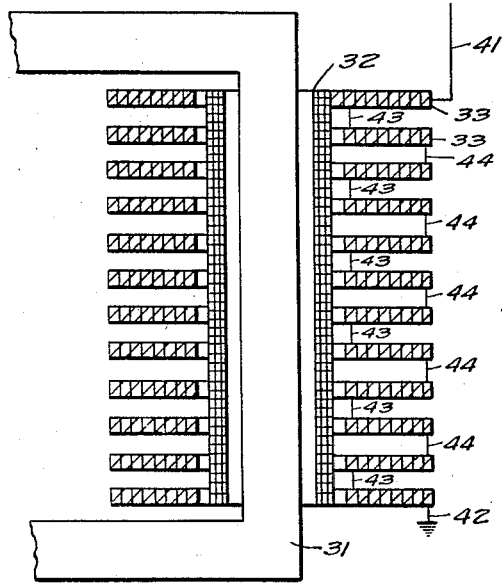
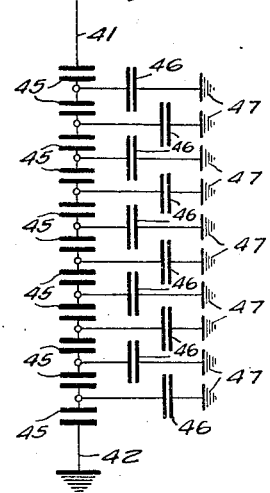
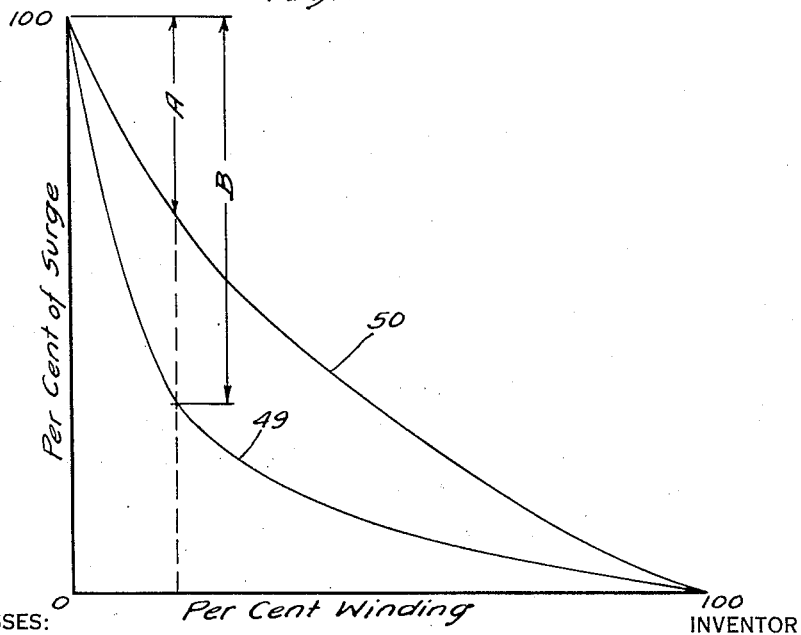
WITNESSES:
E. A. McCloskey
Wm. C. Groove
INVENTOR
Fred J. Vogel.
BY
Franklin E. Hardy
ATTORNEY April 18, 1944.   F. J. VOGEL   2,347,009
ELECTRICAL APPARATUS
Filed June 14, 1941   3 Sheets-Sheet 2
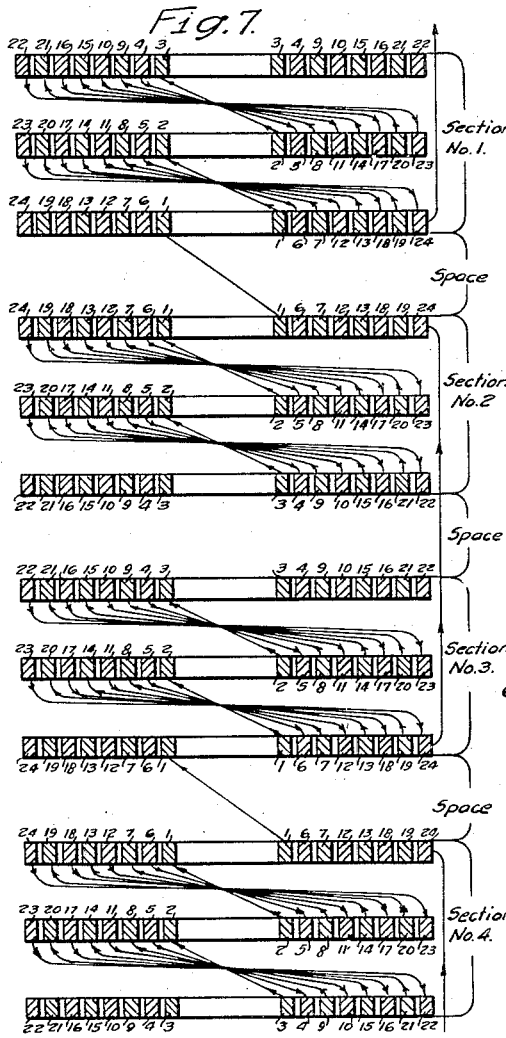
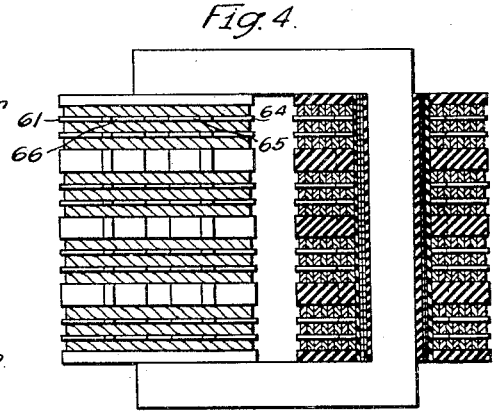
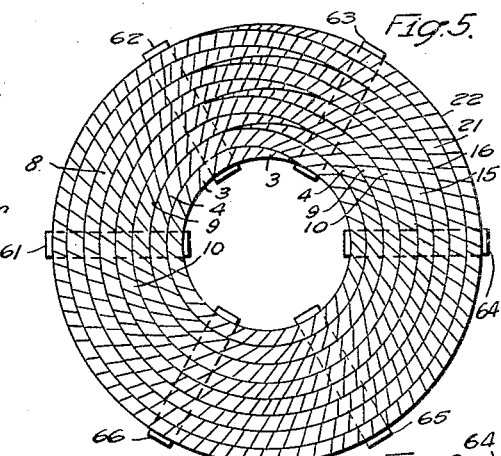
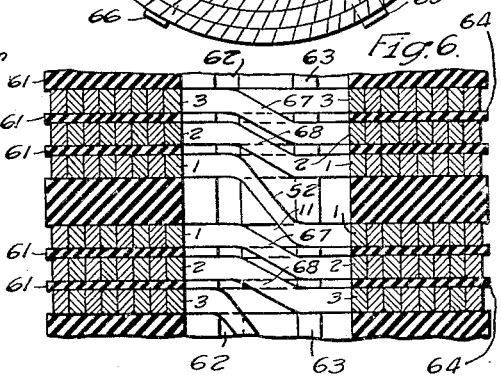
WITNESSES:
E. A. McCloskey
Wm. C. Groome
INVENTOR
Fred J. Vogel.
BY Franklin E. Hardy
ATTORNEY April 18, 1944.   F. J. VOGEL   2,347,009
ELECTRICAL APPARATUS
Filed June 14, 1941   3 Sheets-Sheet 3

WITNESSES:   INVENTOR
   Fred J. Vogel.
   BY
   Franklin E. Hardy
   ATTORNEY

Patented Apr. 18, 1944

2,347,009

UNITED STATES PATENT OFFICE 2,347,009

ELECTRICAL APPARATUS

Fred J. Vogel, Sharon, Pa., assignor to Westinghouse Electric & Manufacturing Company, East Pittsburgh, Pa., a corporation of Pennsylvania Application June 14, 1941, Serial No. 398,067

6 Claims. (Cl. 175—356)

My invention relates to means for improving the electrostatic distribution of surge voltages in the windings of electrical apparatus.

In the windings of electrical apparatus, such as transformers that are connected to a transmission line, the voltage between the terminals of a winding varies uniformly from one end of the winding to the other under normal freqnency and voltage conditions of the system. However, during certain conditions of the system such as may be caused by lightning on the transmission line, a high voltage surge may occur and enter the winding of the transformer.

In windings of the usual construction a voltage surge will not immediately distribute itself along the winding in a manner to establish a uniform voltage gradient, but its initial distribution produces a high concentration of voltage stress on the parts of the winding nearest to the line terminal. When a voltage is suddenly impressed across the terminals of the winding, an instantaneous distribution of the voltage through the winding is effected through the medium of its capacitance.

The capacitance of the winding consists of the entire series and parallel capacity elements existing throughout the winding from one terminal to the other including the capacity from the winding to ground and capacity from one part of the winding to another. The charging of the various capacity elements to the respective potentials corresponding to the initial voltage distribution along the winding is effected by the flow of current between capacity elements which does not flow along the winding conductor through its inductance but only through other series capacitances.

If the initial voltage distribution thus produced throughout the winding is not a uniform voltage gradient, subsequent and more gradual changes take place in an effort to establish a uniform distribution. These changes are effected by currents flowing along the winding transferring charges from one capacity element to another through the inductance of the winding. As is well known, such flow of current between capacity elements through inductance results in oscillations, the current surging back and forth with alternating voltage values above and below the values corresponding to a uniform voltage gradient. The amplitude of the oscillations will initially correspond to the difference between the initial voltage distribution and the final voltage distribution along the uniform gradient. These oscillations create successive voltage stresses between adjacent parts of the winding and between the winding and ground. This dangerous initial voltage distribution and the oscillations resulting therefrom will not occur, however, if the initial voltage distribution, due to capacitance, is uniform with respect to the turns of the winding, that is, if the capacitance associated with the inductance of any winding be disposed in such manner that the potential gradient which would be produced by the capacitance alone is the same as that which would be produced by the inductance alone. The initial voltage stresses and the oscillations resulting from the initial voltage distribution will be greatly reduced if the coil-to-coil capacities are increased so that the potential gradient produced by the capacity alone is more nearly that which would be produced by the inductance alone.

The problem of insulating the conductors and coils of a transformer winding to withstand the surge voltages impressed upon them is a difficult one because in the usual construction of these parts the conductors are so small that satisfactory means of applying sufficient insulation to withstand the voltage stresses are not really available. If sufficient insulating material is applied about the conductors, the space factor between the conductors will become so large as to effect the efficiency of the design. It is, therefore, desirable to provide for lessening the voltage stresses between the several parts of the winding that are caused by the concentration of surge voltages in order to produce a more effective and efficient structure.

This concentration of surge voltage is particularly likely to occur in the case of core type transformers in which stacks of a relatively large number of individual coils are employed, the separate coils being relatively narrow so that the capacity between coils is small as compared to the capacity between the separate coils and ground. The resulting poor voltage distribution results in high voltage stresses between the coils of the winding, particularly those adjacent the end of the winding and, therefore, requires large distances between the coils in order to provide the necessary insulating strength.

It is an object of the invention to provide an arrangement of the turns of the winding of electrical apparatus for improving the distribution of surge voltages throughout the winding.

Other objects and advantages of the invention will be apparent from the following description of a preferred embodiment of the invention, reference being had to the accompanying drawings, in which:

Figure 1 is a sectional view through a portion of a conventional winding structure;

Fig. 2 is a diagram of the capacity network of the high voltage winding of Fig. 1;

Fig. 3 is a diagram illustrating curves showing the initial surge voltage distribution in a high voltage winding of the character shown in Fig. 1 and in a winding constructed in accordance with the invention;

Fig. 4 is an elevational view partly in section showing an arrangement of the winding turns in accordance with the invention;

Fig. 5 is an enlarged top plan view of a winding of the character shown in Fig. 4;

Fig. 6 is a vertical sectional view illustrating the crossover connections of the conductor between different coil layer levels of the winding;

Fig. 7 is a diagram of the connections of a conductor through four sections of a winding constructed in accordance with the invention.

Figure 8:
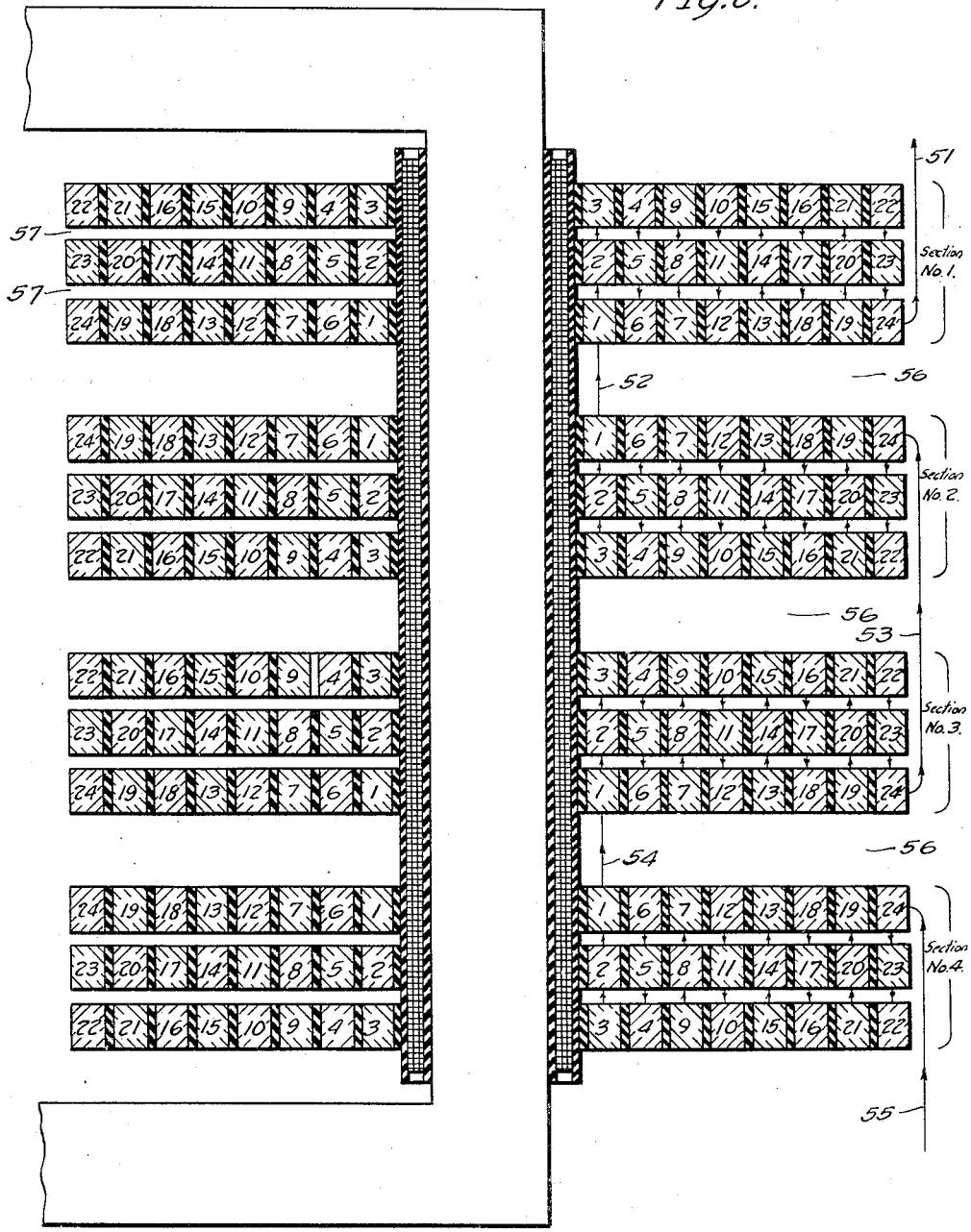
Fig. 8 is an enlarged sectional view of such a winding.

In the drawings, Figure 1 shows a portion of a conventional transformer structure having a winding core leg 31 of magnetic material, about which is positioned a cylindrical low voltage winding 32 and a high voltage winding made up of a stack of disk type coils 33. The winding is connected between a high voltage terminal conductor 41 at the upper end of the stack of coils and at 42 at the lower end of the stack of coils. The coils are shown connected in "start-star, finish-finish" connection, the conductors 43 connecting the "start" ends of alternate coils together and the conductors 44 connecting the "finish" ends of alternate coils together.

The capacity network shown in Fig. 2 corresponds approximately to the arrangement of the capacities between the various parts of the winding and the adjacent parts and between the winding parts and ground. The condenser elements 45 connected in series between the terminals 41 and 42 of the winding corresponding substantially to the capacitance between coils of the winding, and the condensers 46 connected between distributed points of the series chain of condenser elements and ground corresponding to the capacitance between the parts of the winding and the case or core structure which is at ground potential as shown at 47.

If a voltage surge is suddenly applied to the terminals of the winding in Fig. 1, the initial voltage distribution along the winding will be in the order shown in the curve 49 in Fig. 3 in which, it will be noted, a large part of the initial voltage B is impressed across a very small fraction of the winding. For example, about two-thirds of the initial voltage impressed across the whole stack appears across the first two coil layers, so that it will be necessary to provide sufficient insulation between these coils to withstand this large proportion of the total applied voltage.

In accordance with my invention, and as best shown in Figs. 4, 7, and 8, the winding is divided into a number of sections of a number of coil layers each. For purposes of convenience in illustrating the principle of the invention, four sections of three coil layers each are shown, it being understood that in a core type transfomrer a stack of coil layers of several times this number might be employed and that the whole stack might be connected in accordance with the principles of the invention, or, if desired, the portion only of the whole winding nearest the terminal conductor where the voltage gradient is the steepest, as indicated in Fig. 3, may be so connected, if it is determined that the voltage gradient throughout the remainder of the winding is of such a slope that the arrangement of windings herein disclosed is unnecessary.

Referring particularly to Fig. 8, the numbers shown within the cross section of the conductors represent the number of the turn of that conductor in its section. For example, in section No. 1 comprising the three coil layers at the top of the winding in Fig. 8, the first conductor turn is positioned at the bottom of the three layers. The second conductor turn is in the middle layer above the first turn and the third conductor turn in the top layer above the second turn, these three turns in the three coil layers having the same diameter about the axis of the winding. The next three turns 4, 5, and 6 of the winding section likewise have the same diameter as each other and are positioned in the top, middle, and bottom layers, about turns 3, 2, and 1, respectively. The conductor is so wound as to repeat this sequence, the turns 7, 8, and 9 being progressively one above the other and of like diameter about turns 6, 5, and 4 with turns 10, 11, and 12 of the next larger diameter of the section being progressively one below the other, this sequence continuing to the outer edge of the section to include the last or terminal turn 24 of the section. In the several turns of the conductor in section No. 2, the second section from the top of the winding is the same as those of section No. 1 except that the vertical order of turns is reversed, turn No. 1 being at the top instead of the bottom of the section, and each group of three turns of the same diameter such as 1, 2, 3, progressing in the opposite direction downwardly or upwardly from the corresponding three turns in section No. 1, so that the last or terminal turn 24 of section No. 2 is at the top of the outer rim of the section adjacent the turn 24 of section No. 1. Sections No. 3 and No. 4 are arranged identically with sections Nos. 1 and 2, and if a winding of a larger number of sections than four is employed, the arrangement of each sections will duplicate those of sections No. 1 and No. 2.

The winding terminal 51 is connected to the terminal turn 24 of section No. 1, and the conductor continues progressively from turn 24 to turn 1 of section No. 1 and then to turn 1 og section No. 2 as indicated at 52, and then progressively from turn 1 to the terminal turn 24 of section No. 2, this turn being connected to the terminal turn 24 of section No. 3, as shown at 53, and the terminal turns 1 of sections No. 3 and No. 4 being connected together at 54 with the terminal turn 24 of section 4 being connected to the other terminal conductor 55 of the winding. It will be noted that with this arrangement of the turns of the entire winding, a substantial space 56 for insulating purposes must be provided between each of the several sections since the terminal turns 24 have a difference in potential corresponding to the potential across two sections of the winding in series. It will also be noted that the spaces 57 between the several coil layers of a section may be very small, only enough space being provided for the flow of cooling oil, since the voltage stresses between different parts of adjacent coil layers correspond only to the voltage between adjacent winding turns as, for example, between turns 2 and 3, turns 4 and 5, turns 8 and 9, etc. This results in reducing the space required along the length of the column or stack of coil sections required for insulating and cooling the turns of the winding, and the arrangement of the individual turns within the section causes the capacity between winding sections to be much larger than the capacity between the equally spaced coils of a winding of the character shown in Fig. 1 so that in a capacity network of the winding of the character shown in Fig. 2 the series capacities between winding sections or coils are very much larger than where the several turns of the winding progress sequentially throughout one coil layer, as in the conventional type of winding.

Referring to Figs. 5 and 6, the separate coil layers are spaced apart by means of spacer elements, such as 61, 62, 63, 64, 65, and 66, these being repeated for each space between adjacent layers, and the crossovers between layers of a section may conveniently be made between two of these spacers such as in the arc between spacers 62 and 63, as shown in Fig. 6, the crossover between turn 3 and turn 2, of the upper section being shown at 67, the crossover between turn 2 and turn 1 being shown at 68, and the crossover between the two sections being shown at 52, the corresponding crossovers being repeated at 67 and 68 at the lower of the two sections shown in Fig. 6.

In Fig. 7 the sequence of turns are shown in diagrammatical form, it being appreciated that the connections between turns shown are for purposes of illustrating the circuit which may be a single continuous conductor wound with the several turns in the positions indicated, or each section may be wound separately, and the conductor connections between sections completed during the assembly of the sections into the completed transformer structure.

It will be noted by reference to Fig. 3 of the drawings, that the voltage A across the indicated portion of winding constructed in accordance with the invention is about one half the voltage B across a corresponding portion of the conventional winding of Fig. 1. The actual shape of the curve 50 may change with different spacing of the parts, depending upon the desired degree of approach of the initial voltage distribution to a straight line gradient.

It will be apparent to one skilled in the art that modifications in arrangement of parts may be made within the spirit of my invention, and I do not wish to be limited otherwise than by the scope of the appended claims.

I claim as my invention:

1. Electrical apparatus comprising inductively related low voltage and high voltage windings disposed about the winding leg of a core structure, the high voltage winding comprising a continuous winding conductor arranged in a plurality of coil sections arranged in a stack, each section including a plurality of disk type coil layer structures spaced apart, the end of the winding starting at the coil layer in the first section that is remote from the end of the stack and continuing in successive turns through corresponding positions with respect to the distance from the axis in the several coils of the section, the conductor continuing through several winding sections in a series of turns including in sequence in each section, one turn in each coil of the section having similar positions with respect to the axis.

2. In electrical apparatus, a winding comprising a continuous winding conductor arranged in a plurality of coil sections having the same inner and outer diameters, each section including a plurality of flat disk type coil layers extending from the inner to the outer edges of the section spaced apart along a common axis, the end of the winding starting at the coil layer in the first section that is remote from the end of the stack of coils comprising the winding and continuing in series in sequence through the several turns in the separate coil layers of the section that occupy the same position with respect to the axis of the coils so as to alternate from one end of the section to the other in turns of gradually changing diameters.

3. In electrical apparatus, a winding comprising a continuous winding conductor arranged in a plurality of coil sections each section including a plurality of flat disk type coil layers spaced apart in a stack along a common axis, the end of the winding starting at the coil layer in the first section that is remote from the end of the end of the stack of coils comprising the winding and continuing in series in sequence through the several turns in the separate coil layers of the section that occupy the same position with respect to the axis of the coils so as to alternate from one end of the section to the other in turns of gradually changing diameters, the winding conductor continuing through the turns of the second section in the reverse order of the positions of the turns of the first section between the separate coil layers of the section and between the inner and the outer turns thereof.

4. In electrical apparatus, a winding comprising a continuous winding conductor arranged in a plurality of coil sections each section including a plurality of flat disk type coil layers spaced apart in a stack along a common axis, the end of the winding starting at the coil layer in the first section that is remote from the end of the stack of coils comprising the winding and continuing in series in sequence through the several turns in the separate coil layers of the section that occupy the same position with respect to the axis of the coils so as to alternate from one end of the section to the other in turns of gradually changing diameters, the winding conductor continuing through the turns of the second section in the reverse order of the positions of the turns of the first section between the separate coil layers of the section and between the inner and outer turns thereof, so that the terminals of the first two winding sections in series are adjacent each other across the space between the sections.

5. In electrical apparatus, a winding formed of a continuous conductor arranged in a plurality of flat disk type coil layer structures having the same inner and outer diameters spaced from each other in a stack along a common axis and grouped into a plurality of winding sections, each section including a plurality of coil layers, the winding terminal being at the coil layer in the first section that is remote from the end of the stack of coils comprising the section, the conductor continuing in sequence through the several turns in the several coil layers of the section that occupy the same distance from the axis of the coils so as to progress through the turns of the coil layers alternately from one end of the section to the other in a series of turns having progressively changing diameters.

6. In electrical apparatus, a winding formed of a continuous conductor arranged in a plurality of flat disk type coil layer structures having the same inner and outer diameters spaced from each other in a stack along a common axis and grouped into a plurality of winding sections, each section including a plurality of coil layers, the winding terminal being at the outer turn of the coil in the first section that is remote from the end of the stack of coils comprising the section and continuing in sequence progressively through the several outer turns of the separate coils of the section and in sequence through the several turns of the separate coils of the section occupying the same distance from the axis of the coils.

FRED J. VOGEL.